3,211,681
SIZING EMULSIONS COMPRISING A PETROLEUM RESIN-MALEIC ANHYDRIDE ADDITION PRODUCT AND A FATTY ACID
Morimasa Arakawa, Osaka, Koichi Hirooka, Nara, Takao Kosugi, Nadaku, Kobe, and Masaaki Kawano, Jyotoku, Osaka, Japan, assignors to Arakawa Rinsan Kagaku Kogyo Kabushiki Kaisha, Osaka, Japan, a corporation of Japan
No Drawing. Filed Mar. 8, 1960, Ser. No. 13,420
Claims priority, application Japan, Dec. 15, 1959, 34/39,237
5 Claims. (Cl. 260—23)

The present invention relates to sizing agents for papermaking and more particularly to sizing agents in the form of an emulsion, the main raw material of which is a synthetic resin of petroleum origin (hereafter designated as petroleum resin) from the heavy bottom resulting from the cracking distillation of petroleum.

The present invention relates also to processes for the production of sizing agents for paper-making described above.

An object of this invention is to provide an emulsified product having superior efficiency as a sizing agent for paper-making.

Another object of this invention is to provide processes in which an emulsified product having superior efficiency as sizing agents for paper making may be easily and economically produced from petroleum resin which is very cheap and abundant as a resin material.

Hitherto rosin has been used, in general, as a main raw material for the production of sizing agent for papermaking. Recently rosin is becoming short in supply so that the price of the sizing agent made from the rosin as main raw material is on the increase.

From our investigations we have found that petroleum resin is substantially similar to rosin in physical properties such as appearance, softening point and the like while the former is vastly superior in water repellency to the latter so that it can be utilized as a raw material for a useful sizing agent for paper-making. However the petroleum resin is sufficiently different in chemical properties from the rosin that it does not yield a sizing agent having a required fixing on paper pulp by simple emulsification.

According to the present invention it is possible to produce an emulsified product having an excellent sizing efficiency from petroleum resin by homogeneously dispersing the resin in water in a finely divided form, the sizing efficiency of said emulsified product being considerably higher than that of the usual rosin sizing agent when applied to the paper pulp under the same conditions.

The petroleum resin may be obtained from petroleum by polymerization of hydrocarbons having several unsaturated bonds which are produced as a by-product in the course of cracking distillation of petroleum. The composition of the petroleum resin may be somewhat varied owing to the kind of crude oil and to the several conditions on which the cracking, distillation and separation of petroleum are carried out. In general, said petroleum resin is a material obtained from the polymerization of mixtures of aliphatic and monocyclic aromatic compounds and having some unsaturated bonds, a softening point of 30–130° C., preferably 60–100° C., color (rosin standard) X–D, particularly N–K, a specific gravity ($d_{15}^{15}$) 0.9–1.20, particularly 1.06–1.08, an acid value less than 1.0, and an iodine value (Wijs method) 30–230, particularly 50–100.

The petroleum resin is insoluble in aqueous alkaline solution unlike the rosin. In order to produce a sizing agent from the petroleum resin, therefore, it is required to make said resin into an emulsified product by homogeneously dispersing it in water in a finely divided form. According to the present invention the petroleum resin is modified to $\alpha,\beta$-unsaturated acid addition product, to which solid fatty acid alone or together with waxes is added and melted. Thereafter a part or the whole of the molten mass is saponified with alkali and dispersed in water to improve the emulsifying property and fixing property on the paper-pulp. By this procedure a sizing agent having such a superior sizing efficiency as will be shown hereinbelow can be readily and economically produced on a commercial scale. It is not always necessary to convert the entire quantity of petroleum resin used into its $\alpha,\beta$-unsaturated acid addition product. That is to say, in this invention $\alpha,\beta$-unsaturated acid addition product containing an appropriate amount of petroleum resin can also be effectively used. Said addition product may be obtained by leaving a part of petroleum resin as it is in the case in which the addition product is produced or by separately adding fresh petroleum resin to the prepared addition product.

According to the present invention, when the petroleum resin is subjected to heat with $\alpha,\beta$-unsaturated acid or a compound producing $\alpha,\beta$-unsaturated acid by heating, a petroleum resin having a carboxyl group is produced by the addition reaction which is assumed to be based upon the unsaturated bonds. Among the $\alpha,\beta$-unsaturated acids, maleic anhydride is suitable. However maleic acid, fumaric acid, itaconic acid and the like may also be advantageously used. Furthermore, citric acid and the like may be utilized as a compound producing $\alpha,\beta$-unsaturated acid by heating.

As already mentioned above, the petroleum resin having a carboxyl group is mixed with solid fatty acid alone or together with waxes and melted by heating to a homogeneous state. The proportion of said resin, solid fatty acid and waxes to be used should be properly controlled in accordance with the kinds of petroleum resin, of pulp to be sized and the conditions for paper-making. By the proper control, the range in which the sizing agent of this invention is applied can be selected to a wide extent. As a suitable solid fatty acid steric acid is preferable. Furthermore, the whole of the fatty acids of animal and vegetable oils which are solid at room temperature such as fatty acids of hardened oil, coconut oil, tallow and the like may be used similarly. Under certain conditions, the waxes in the petroleum series, those of the animal series, vegetable series and insect series as well as synthetic wax and the like may advantageously be used alone or in a mixed state.

The effective compositions of a wax type sizing agent according to this invention are as follows:

| | Percent |
|---|---|
| Petroleum resin | 60–85 |
| Waxes | 0–25 |
| Solid fatty acid | 15–30 |
| $\alpha,\beta$-Unsaturated acid | 1–10 |

The mixture thus obtained is added to an aqueous alkali solution and melted while stirring, whereupon said mixture becomes a white emulsified substance. Cooling of said emulsified substance produces a sizing agent easily dispersible in water. Alkalis which may be used are the usual basic substances of inorganic and organic series and they may effectively be employed in such amount as required to neutralize a part or whole of acids contained in the aforesaid resin mixture.

Every one of the constituents to be used in this invention relates to the sizing efficiency separately but at the same time they have each different merits and defects respectively. By nature wax sizing agents would exhibit high sizing efficiency only in the case of being used in such a large amount as to impair the quality of the paper. On the contrary the petroleum resin, in the case for which it is employed as a sizing agent in the form of simple emulsified matter, would improve the quality of paper but it exhibits less sizing efficiency due to its inferior fixing on paper. A reaction product of petroleum resin with $\alpha,\beta$-unsaturated acids exhibits an improved fixation and a high sizing efficiency even in small amounts. The reason why the sizing agents according to the present invention exhibit superior sizing efficiency in wide extent over various kinds of papers is based upon the fact that the merits of each constituent of the sizing agents are synergistically displayed.

The sizing agents of this invention are stable for long periods of time and are stable to vibration and the like. Furthermore, the sizing agents have no risk of causing foaming during paper-making, and do not stain the paper-making machine and the like.

The invention will be explained by way of the following examples but is not to be taken as limited by them.

EXAMPLE 1

63 kg. of yellowish petroleum resin, softening point 90° C., obtained from polymerization of heavy bottom of cracking-distillation of petroleum and 3 kg. of maleic anhydride are caused to react with each other at a temperature of 200° C. for eight hours. To the reaction product are added 10 kg. of stearic acid and 24 kg. of microcrystalline wax (Multiwax W–445, melting point 74° C.) and the obtained mixture is homogeneously melted while stirring and at the same time hot alkaline solution of 5.4 kg. of caustic potash in 22 kg. of water is added. The product thus obtained is diluted by the addition of 73 kg. of hot water and is cooled to produce a white emulsified product containing 50% solid matter.

EXAMPLE 2

80 kg. of brownish petroleum resin, softening point 82° C., obtained from polymerization of heavy bottom of cracking-distillation of petroleum and 2 kg. of maleic anhydride are caused to react with each other at a temperature of 200° C. for eight hours. To this reaction product is added 20 kg. of stearic acid and the mixture is melted while stirring and at the same time hot alkaline solution of 4.1 kg. of caustic soda in 18 kg. of water is added. To the product thus obtained there is added 84 kg. of hot water and the mixture is cooled to produce a white emulsified product containing 50% solid matter.

EXAMPLE 3

80 kg. of brownish petroleum resin, softening point 82° C., obtained from polymerization of heavy bottom of cracking-distillation of petroleum are mixed with 20 kg. of stearic acid; 10 kg. of microcrystalline wax and 5 kg. of maleic anhydride. The mixture is heated at a temperature of 200° C. for eight hours to cause the substances to react with each other. After cooling to 100° C., the molten mixture is poured into a hot alkaline solution of 9.7 kg. of caustic potash in 34 kg. of water while stirring and then into 80 kg. of hot water. Cooling of this mixed mass gives a white emulsified product containing 50% solid matter.

The result of sizing tests with the sizing agents produced in Examples 1, 2 and 3 will be described in the following table. A hitherto known rosin sizing agent and 5% maleic modified rosin sizing agent are adopted as controls.

Each sample is added to a beater containing a bleached sulfite pulp which is beaten to 28° S.R. Then aluminium sulfate is added to bring the mixture to pH 4.5. From the stock thus produced, three papers for each sample are sheeted in usual manner.

The basis weight of each of the papers to be tested is 60 g. per sq. m. Sizing efficiencies shown in the following table are the average of times that are measured by Stöckigt method (JIS P–8122) at 18 positions consisting of 6 positions for each sheet of paper.

*Results of sizing tests*

| Amount of sizing agent added to pulp | 0.5% | 1.0% | 1.5% | 2.0% | 3.0% |
|---|---|---|---|---|---|
| Sizing degree: | Sec. | Sec. | Sec. | Sec. | Sec. |
| Rosin sizing agent | 24.4 | 37.5 | 41.4 | 42.7 | 43.5 |
| Sizing agent in Example 1 | 33.0 | 40.5 | 48.6 | 54.2 | 65.1 |
| Sizing agent in Example 2 | 33.9 | 41.6 | 47.5 | 53.0 | 62.0 |
| Sizing agent in Example 3 | 32.2 | 39.3 | 46.3 | 51.8 | 60.6 |
| Maleic modified rosin sizing agent | 37.1 | 42.5 | 45.7 | 46.6 | 46.7 |

What we claim is:

1. A sizing agent for paper making, consisting essentially of an aqueous emulsified product which is at least partially neutralized and is constituted by a mixture of (1) an addition product of petroleum resin, said addition product being obtained by the reaction of a compound selected from the group consisting of maleic anhydride, maleic acid, fumaric acid, and itaconic acid with petroleum resin, said petroleum resin having a softening point of between 30 and 130° C., an iodine value (Wijs method) of between 30 and 230 and a specific gravity $d_{15}^{15}$ of between 0.9 and 1.2, (2) a solid fatty acid and (3) a wax.

2. A sizing agent for paper making consisting essentially of an aqueous emulsified product which is at least partially neutralized and is constituted by a mixture of (1) an addition product of petroleum resin, said addition product being obtained by the reaction of 1–10 parts of a compound selected from the group consisting of maleic anhydride, maleic acid, fumaric acid, and itaconic acid with 60–85 parts of petroleum resin, said petroleum resin having a softening point of between 30 and 130° C., an iodine value (Wijs method) of between 30 and 230 and a specific gravity $d_{15}^{15}$ of between 0.9 and 1.2, (2) 15 to 30 parts of a solid fatty acid, and (3) a wax present in an amount of up to 25 parts.

3. A process for the production of a sizing agent for paper making, said process comprising reacting 1–10 parts of a compound selected from the group consisting of maleic anhydride, maleic acid, fumaric acid, and itaconic acid with 60–85 parts of a petroleum resin having a softening point of 30–130° C., an iodine value (Wijs method) of 30–230, and a specific gravity $d_{15}^{15}$ of 0.9–1.2, adding 15–30 parts of a solid fatty acid to the thus obtained reaction product, heating the thus produced mixture to a melted homogeneous state, saponifying the mixture with an aqueous solution of alkali while stirring, and dispersing the saponified product in water.

4. A process for the production of a sizing agent for paper making, said process comprising reacting 1–10 parts of a compound selected from the group consisting of maleic anhydride, maleic acid, fumaric acid, and itaconic acid with 60–85 parts of a petroleum resin having a softening point of 30–130° C., an iodine value (Wijs method) of 30–230, and a specific gravity $d_{15}^{15}$ of 0.9–1.2, adding 15–30 parts of a solid fatty acid together with up to 25 parts of a wax to the thus obtained reaction product, heating the thus produced mixture to a melted homogeneous state, saponifying the mixture with an aqueous solution of alkali while stirring, and dispersing the saponified product in water.

5. A process as claimed in claim 4, wherein said wax is selected from the group consisting of the waxes in the petroleum series, animal series, vegetable series and synthetic series.

References Cited by the Examiner

UNITED STATES PATENTS

| | | | |
|---|---|---|---|
| 1,948,442 | 2/34 | Ellis | 162—168 |
| 2,576,914 | 12/51 | Barrett | 117—155 |
| 2,702,796 | 2/55 | Fine | 260—23 |
| 2,725,367 | 11/55 | Niederhauser | 260—78.5 |
| 2,837,439 | 6/58 | Swearingen et al. | 106—238 |
| 2,933,468 | 4/60 | Aldridge et al. | 260—78.4 |
| 2,992,963 | 7/61 | Nagel et al. | 117—155 |
| 3,005,800 | 10/61 | Powers et al. | 260—78.4 |

FOREIGN PATENTS 509,084   1/55   Canada.

LEON J. BERCOVITZ, *Primary Examiner.*

ALLEN M. BOETTCHER, ALPHONSO D. SULLIVAN,
*Examiners.*